United States Patent
Martin et al.

(10) Patent No.: US 9,909,473 B2
(45) Date of Patent: Mar. 6, 2018

(54) METHOD AND SYSTEM FOR GAS PARTICULATE FILTER

(71) Applicant: Ford Global Technologies, LLC, Dearborn, MI (US)

(72) Inventors: Douglas Raymond Martin, Canton, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 572 days.

(21) Appl. No.: 14/540,307

(22) Filed: Nov. 13, 2014

(65) Prior Publication Data

US 2016/0138447 A1 May 19, 2016

(51) Int. Cl.
*F01N 3/00* (2006.01)
*F01N 3/021* (2006.01)
*F01N 11/00* (2006.01)
*F01N 13/18* (2010.01)

(52) U.S. Cl.
CPC ............ *F01N 3/021* (2013.01); *F01N 11/002* (2013.01); *F01N 13/18* (2013.01); *F01N 2410/00* (2013.01); *F01N 2450/00* (2013.01); *F01N 2550/04* (2013.01); *F01N 2560/08* (2013.01); *Y02T 10/20* (2013.01); *Y02T 10/47* (2013.01)

(58) Field of Classification Search
CPC .... F01N 3/033; F01N 2550/04; F01N 13/011; F01N 9/002
See application file for complete search history.

(56) References Cited

U.S. PATENT DOCUMENTS

| | | | |
|---|---|---|---|
| 5,488,826 A | 2/1996 | Paas | |
| 5,930,995 A * | 8/1999 | Watanabe | ............... F01N 3/021 55/DIG. 30 |
| 6,632,110 B2 | 10/2003 | Kato | |
| 6,729,128 B2 * | 5/2004 | Shiratani | ............... F01N 13/011 60/275 |
| 8,051,645 B2 | 11/2011 | Chamarthi et al. | |
| 8,347,615 B2 | 1/2013 | Host et al. | |
| 8,532,911 B2 | 9/2013 | Haskara et al. | |
| 8,683,786 B2 | 4/2014 | Ruona et al. | |
| 2009/0077954 A1 | 3/2009 | Winsor et al. | |

OTHER PUBLICATIONS

Martin, D. et al., "Engine Refurbishment Using Ionized Air," U.S. Appl. No. 14/632,856, filed Feb. 26, 2015, 36 pages.
Martin, D. et al., "Method and System for Reducing Engine Exhaust Emissions," U.S. Appl. No. 14/689,309, filed Apr. 17, 2015, 40 pages.

* cited by examiner

*Primary Examiner* — Mark Laurenzi
*Assistant Examiner* — Jason Sheppard
(74) *Attorney, Agent, or Firm* — Julia Voutyras; McCoy Russell LLP

(57) ABSTRACT

Methods and systems are provided for diagnosing a particulate filter located in an exhaust runner of an engine cylinder. In one example, a method may include flowing exhaust from a first cylinder through a first particulate filter in a first runner, and flowing exhaust from a second cylinder through a second particulate filter in a second runner. The method may further include adjusting engine operation in response to particulate filter degradation, the particulate filter degradation distinguishing between degradation of the first and second particulate filters based on an exhaust pressure pulsation timing relative to combustion events.

12 Claims, 6 Drawing Sheets

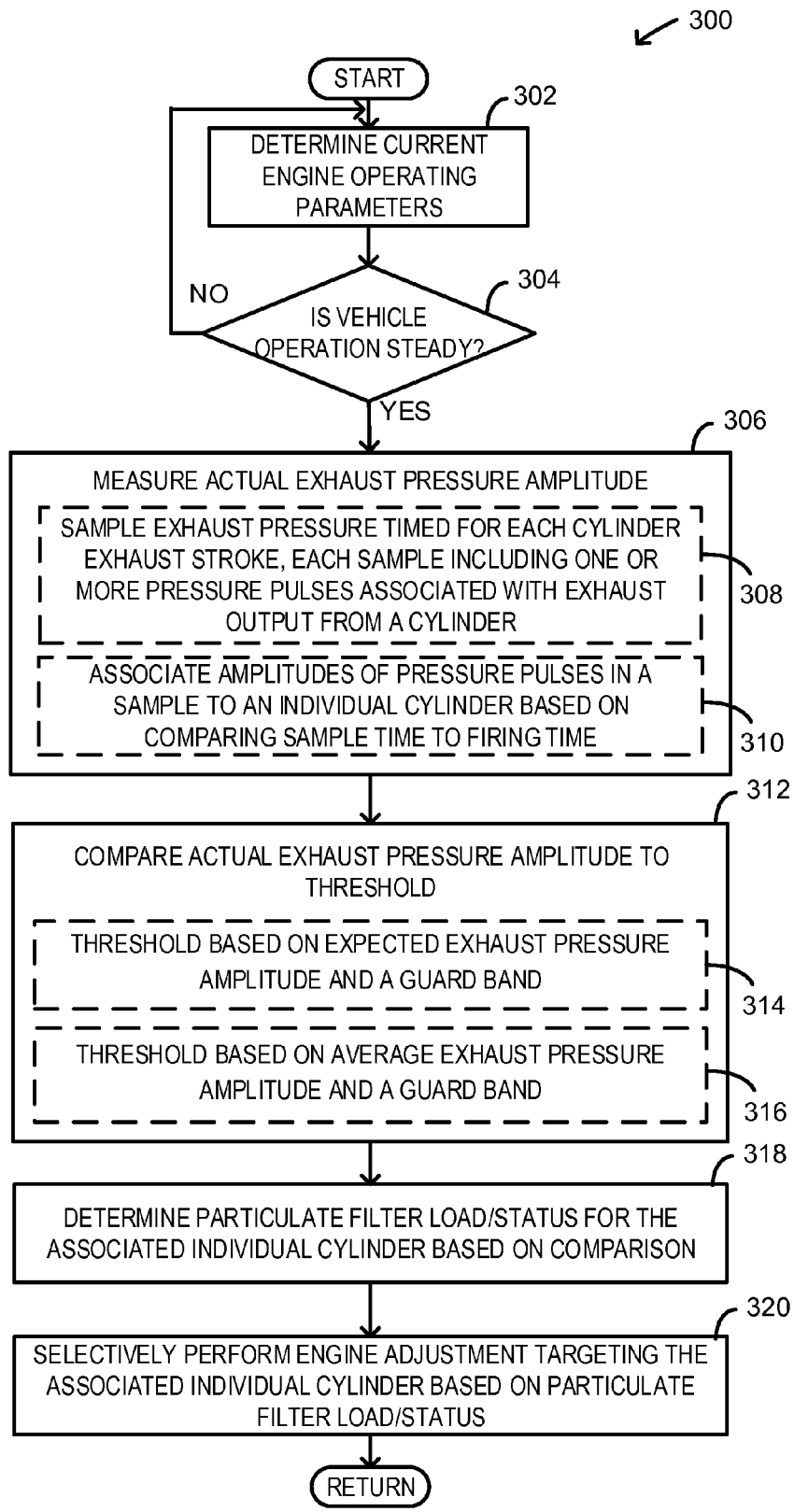

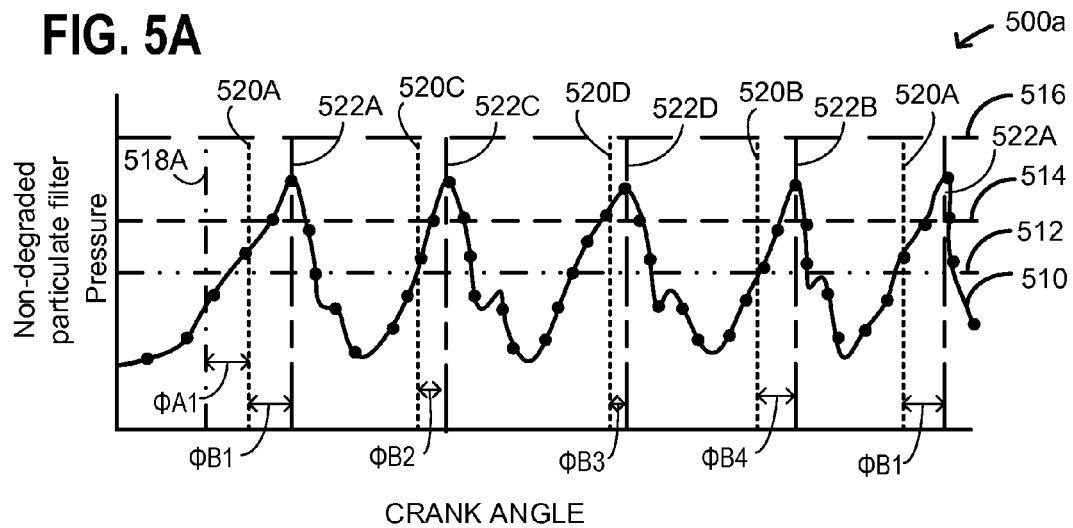
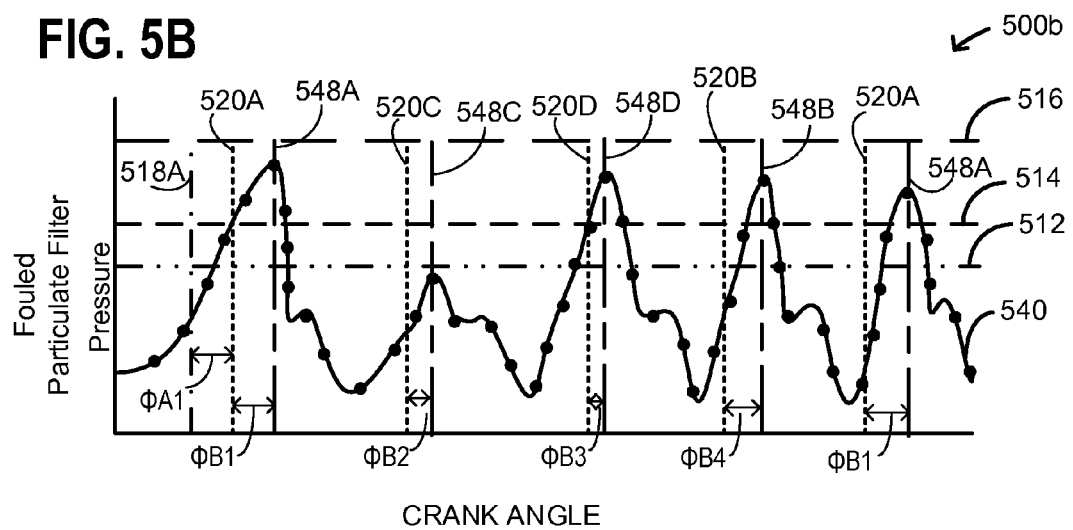
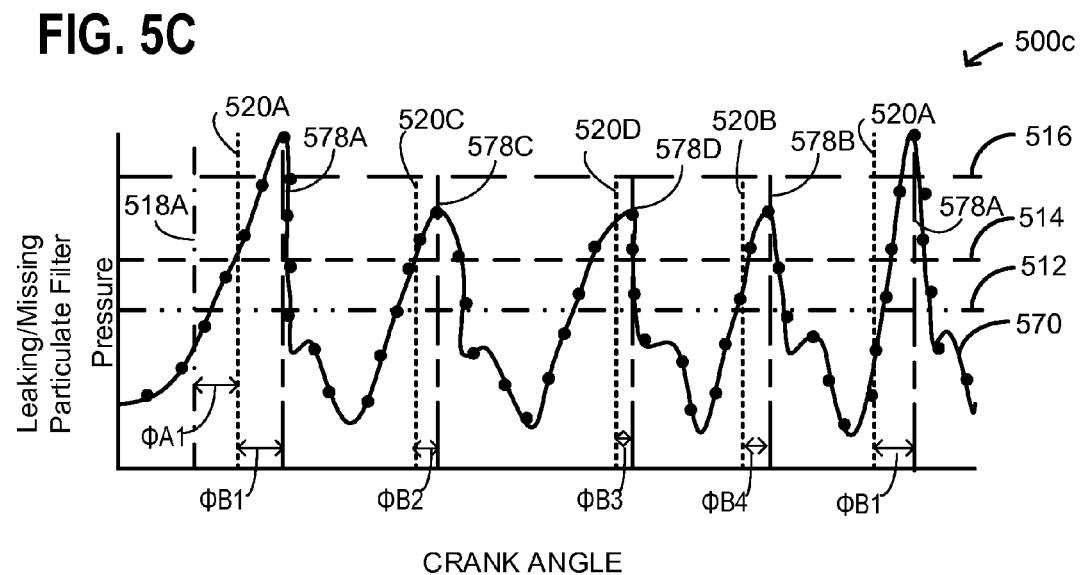

METHOD AND SYSTEM FOR GAS PARTICULATE FILTER

FIELD

The present description relates generally to methods and systems for controlling a vehicle engine for selectively regenerating a gas particulate filter.

BACKGROUND/SUMMARY

Emission after-treatment devices are used to collect particulate matter from the exhaust gas of internal combustion engines. In particular, emission treatment devices may include particulate filters, oxidation catalysts, and nitrous oxide (NOx) catalysts. A problem exists with particulate filters in that the particulates, which are largely made up of carbon particles, tend to plug the filters, restricting the flow of an exhaust gas. In order to periodically regenerate or purge the filter of particulates, it is known to take measures which result in an increase of the exhaust gas temperature above a predetermined level (e.g. above 600° C.) in order to incinerate the carbon particles accumulated in the filter.

One method used to increase the exhaust gas temperature may involve controlling a throttle valve in the intake manifold of the engine. In particular, by throttling/closing the throttle valve, the exhaust gas temperature may be increased for all cylinders, to the detriment of fuel economy. Gas particulate filters that are targeted by such regeneration methods may be placed upstream of a turbine and downstream of an exhaust manifold. One example approach is shown by Winsor et al. in U.S. Pat. US20090077954. The non-catalyzed particulate filter described therein receives exhaust gas with temperatures high enough, after a combustion event with an excess of air, to regenerate the filter.

However, the inventors herein have recognized potential issues with such systems. As one example, these systems place the particulate filter outside the exhaust manifold and as a result utilize increased engine adjustments to raise exhaust gas temperatures and cause an overall reduction in fuel economy. As a second example, use of a single, large particulate filter provides an engine system with few diagnostic capabilities. If an individual cylinder injector spray is degraded, a system with a single, large particulate filter cannot diagnose the degradation because the exhaust of one cylinder has a minimal effect on the particulate filter receiving exhaust from a plurality of cylinders.

In one example, the issues described above may be addressed by flowing exhaust from a first cylinder through a first particulate filter in a first runner, flowing exhaust from a second cylinder through a second particulate filter in a second runner, and adjusting engine operation in response to particulate filter degradation, the particulate filter degradation distinguishing between degradation of the first and second particulate filter based on exhaust pressure pulsation timing relative to combustion events. An engine controller may detect a high particulate matter load in a particulate filter or a leaking/missing particulate filter in the exhaust runner of an individual engine cylinder based on a comparison of a measured exhaust pressure amplitude against a threshold. In this way, each individual particulate filter may be independently evaluated for particulate matter load and fouled particulate filters may be independently regenerated by adjusting operation of only the engine cylinder corresponding to that fouled particulate filter. The inventors have also recognized that independent particulate filter fouling may indicate a fouled or otherwise degraded fuel injector.

For example, an individual particulate filter with a higher than expected or average particulate matter load may indicate that the fuel injector for the associated cylinder is exhibiting a deviating spray pattern (e.g., due to matter build-up on the injector nozzle) that causes incomplete combustion or otherwise results in high particulate matter output from the cylinder. By increasing the cylinder temperature to regenerate the particulate filter as described above, the matter build-up on the fuel injector may also be reduced to reduce overall particulate matter output from the cylinder. Furthermore, the inventors have realized that positioning the individual particulate filters within the exhaust runners enables particulate filtering in such filters to be increased relative to filtering with particulate filters positioned further downstream due to higher heat being present the exhaust runner than other downstream areas in which particulate filters may be located in other vehicle configurations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a high-level flow chart detailing a method to diagnose a high particulate matter load in an exhaust runner particulate filter.

FIGS. 5A-C show graphs illustrating various pressure sensor amplitudes for an engine with a standard gas particulate filter, degraded particulate filter, or leaking/missing particulate filter, respectively.

DETAILED DESCRIPTION

The present description relates to particulate filter regeneration and injector spray diagnostics. In conventional engine systems, gasoline particulate filters are placed downstream of a catalytic converter and regenerated via engine adjustments to heat exhaust gas. The inventors herein provide individual particulate filters, each placed in one of a plurality of exhaust runners coupling the engine cylinders to an exhaust manifold. As each exhaust runner is coupled to one of the engine cylinders, the performance of the individual particulate filters within the exhaust runners may be analyzed to diagnose high particulate matter load caused by an individual cylinder and/or a deviating fuel injector spray for an individual cylinder.

Figure 1:
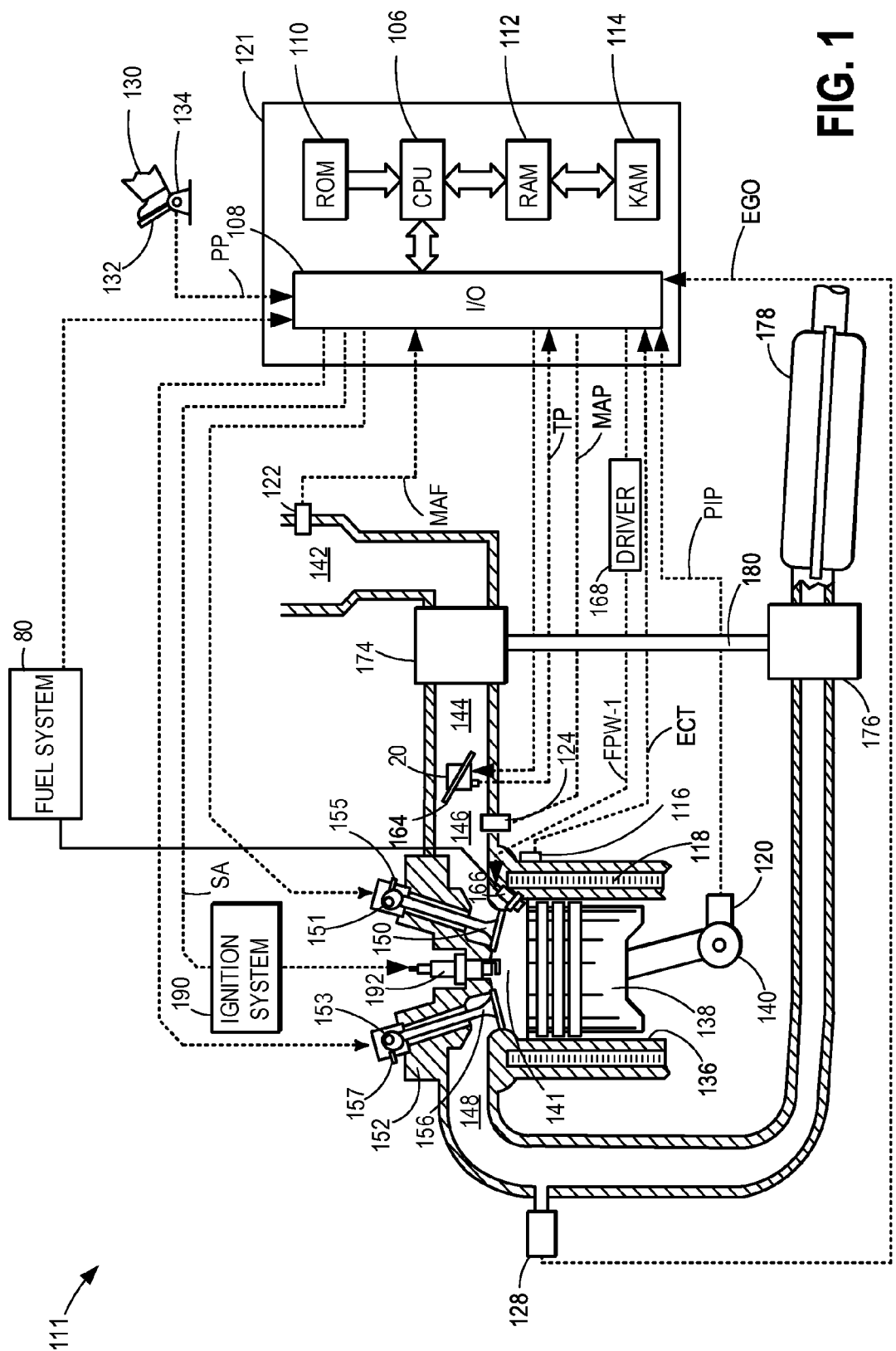
FIG. 1 shows an example cylinder of an engine in accordance with the present disclosure.

Referring now to the figures, FIG. 1 depicts an example embodiment of a combustion chamber or cylinder of internal combustion engine 111. Engine 111 may receive control parameters from a control system including controller 121 and input from a vehicle operator 130 via an input device 132. In this example, input device 132 includes an accelerator pedal and a pedal position sensor 134 for generating a proportional pedal position signal PP. Cylinder (herein also "combustion chamber") 141 of engine 111 may include combustion chamber walls 136 with piston 138 positioned therein and is capped by cylinder head 152. Cylinder head 152 may be contiguous with the head of other cylinders (not shown). A cooling jacket (not shown) may be arranged in cylinder head 152 and/or within combustion chamber walls 136. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 111.

Embodiments of the internal combustion engine are advantageous in which the at least one cylinder head is equipped with an integrated coolant jacket. In particular, supercharged internal combustion engines are thermally highly loaded, as a result of which high demands are placed on the cooling arrangement.

It is possible for the cooling arrangement to take the form of an air-type cooling arrangement or a liquid-type cooling arrangement. However, it is possible for greater quantities of heat to be dissipated using a liquid-type cooling arrangement than is possible using an air-type cooling arrangement.

Liquid cooling requires the cylinder head or the cylinder block to be equipped with an integrated coolant jacket, that is to say the arrangement of coolant ducts which conduct the coolant through the cylinder head or cylinder block. The heat is dissipated to the coolant already in the interior of the component. The coolant is fed by means of a pump (not shown) arranged in the cooling circuit, such that the coolant circulates in the coolant jacket. The heat which is dissipated to the coolant is in this way dissipated from the interior of the head or block and extracted from the coolant again in a heat exchanger (not shown).

Cylinder 141 can receive intake air through inlets in cylinder head 152 via a series of intake air passages 142, 144, and 146. Intake air passage 146 may communicate with other cylinders of engine 111 in addition to cylinder 141. In some embodiments, one or more of the intake passages may include a boosting device such as a turbocharger or a supercharger. For example, FIG. 1 shows engine 111 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 111 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Embodiments of the internal combustion engine are advantageous in which the internal combustion engine is a naturally aspirated engine.

In particular, however, embodiments of the internal combustion engine are advantageous in which a supercharging device is provided. The exhaust gases in the cylinders of a supercharged internal combustion engine are at considerably higher pressures during the operation of the internal combustion engines, as a result of which the dynamic wave phenomena in the exhaust-gas discharge system during the charge exchange, in particular the pre-outlet shock, are considerably more pronounced.

Accordingly, the problem of the mutual influencing of the cylinders during the charge exchange is of even greater relevance in the case of supercharged internal combustion engines.

Embodiments of the internal combustion engine are advantageous in particular in which at least one exhaust-gas turbocharger is provided which comprises a turbine arranged in the exhaust-gas discharge system.

The advantages of an exhaust-gas turbocharger for example in relation to a mechanical charger are that no mechanical connection for transmitting power exists or is required between the charger and internal combustion engine. While a mechanical charge draws the energy required for driving it entirely from the internal combustion engine, the exhaust-gas turbocharger utilizes the exhaust-gas energy of the hot exhaust gases. The energy imparted to the turbine by the exhaust-gas flow is utilized for driving a compressor which delivers and compresses the charge air supplied to it, whereby supercharging of the cylinders is achieved. A charge-air cooling arrangement may be provided, by means of which the compressed combustion air is cooled before it enters the cylinders.

Supercharging serves primarily to increase the power of the internal combustion engine. Supercharging is however also a suitable means for shifting the load collective toward higher loads for the same vehicle boundary conditions, whereby the specific fuel consumption can be lowered.

Embodiments of the internal combustion engine are advantageous in particular in which two exhaust-gas turbochargers are provided which comprise two turbines arranged in the exhaust-gas discharge system.

If one exhaust-gas turbocharger is provided, a torque drop is often observed when a certain engine rotational speed is undershot. The torque drop is understandable if one takes into consideration that the charge pressure ratio is dependent on the turbine pressure ratio. For example, if the rotational speed is reduced, this leads to a smaller exhaust-gas mass flow and therefore to a lower turbine pressure ratio. This has the result that, toward lower engine speeds, the charge pressure ratio likewise decreases, which equates to a torque drop.

Here, it is fundamentally possible for the drop in charge pressure to be counteracted by means of a reduction in the size of the turbine cross section, and the associated increase in the turbine pressure ratio, which however leads to disadvantages at high rotational speeds.

It is therefore often sought to increase the torque characteristic of a supercharged internal combustion engine through the use of more than one exhaust-gas turbocharger, that is to say by means of a plurality of turbochargers arranged in parallel or in series, that is to say by means of a plurality of turbines arranged in parallel or in series.

If two exhaust-gas turbochargers are provided, embodiments of the internal combustion engine are advantageous in which the two turbines in the overall exhaust line are arranged in series.

By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which increases the torque characteristic in the lower part-load range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust system upstream of the high-pressure turbine and opens into the exhaust system again downstream of the turbine, wherein a shut-off element is arranged in the bypass line in order to control the exhaust-gas flow conducted past the high-pressure turbine.

The response behavior of an internal combustion engine supercharged in this way is considerably increased, in particular in the part-load range, in relation to a similar internal combustion engine with single-stage supercharging. The reason for this can also be considered to be the fact that the relatively small high-pressure stage is less inert than a relatively large exhaust-gas turbocharger used for single-stage supercharging, because the rotor of an exhaust-gas turbocharger of smaller dimensions can accelerate and decelerate more quickly.

The turbine of the at least one exhaust-gas turbocharger may be equipped with a variable turbine geometry, which permits a more comprehensive adaptation to the respective operating point of the internal combustion engine through adjustment of the turbine geometry or of the effective turbine cross section. Here, adjustable guide blades for influencing the flow direction are arranged in the inlet region of the turbine. In contrast to the rotor blades of the rotating rotor, the guide blades do not rotate with the shaft of the turbine.

If the turbine has a fixed, invariable geometry, the guide blades are arranged in the inlet region so as to be stationary but also completely immovable, that is to say rigidly fixed. In contrast, in the case of a variable geometry, the guide blades are duly also arranged so as to be stationary but not so as to be completely immovable, rather so as to be rotatable about their axis, such that the flow approaching the rotor blades can be influenced.

Figure 2:
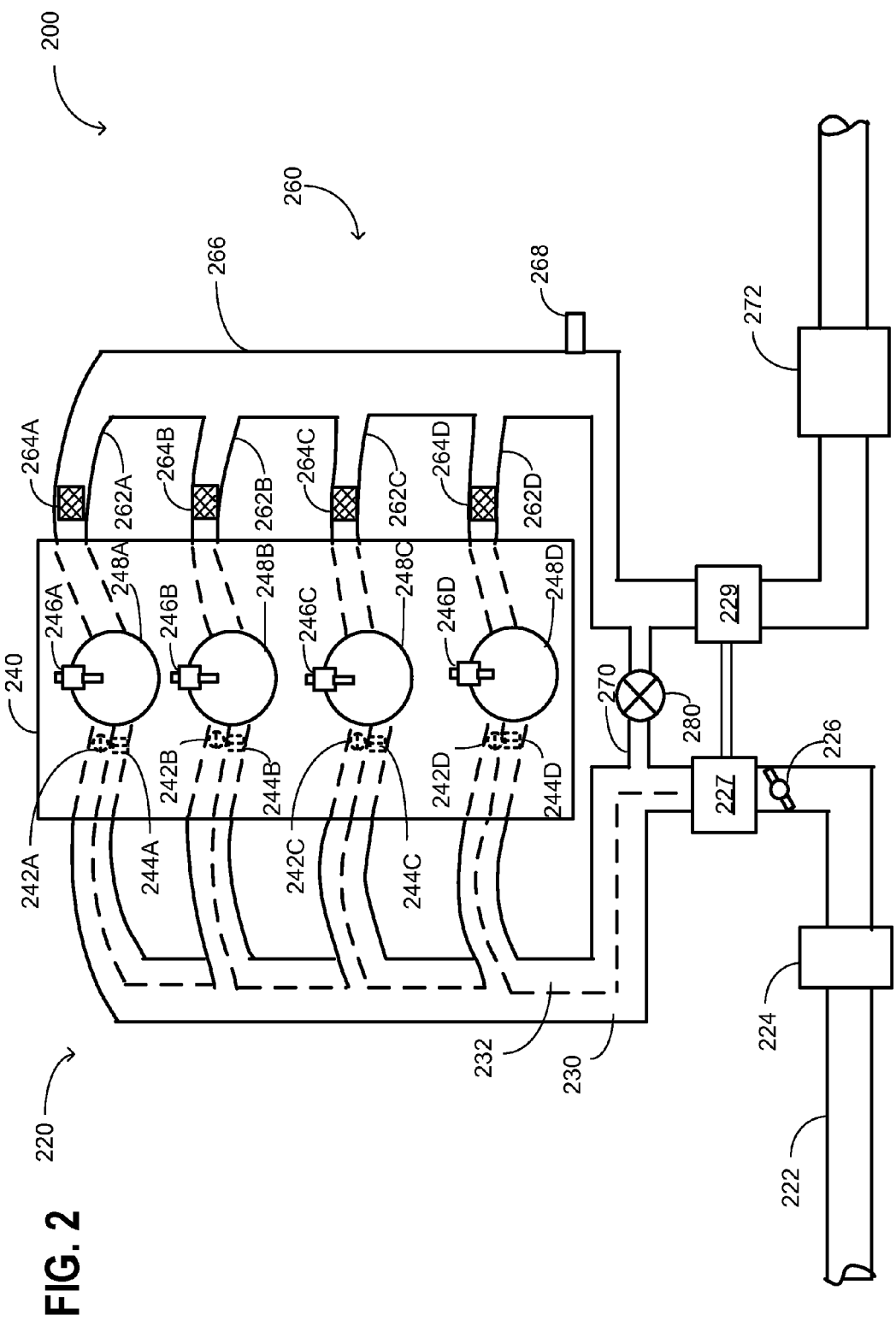
FIG. 2 shows an example engine with an individual particulate filter in each of the cylinder exhaust runners.

Exhaust passage 148 may receive exhaust gases from other cylinders of engine 111 in addition to cylinder 141 via an exhaust runner, such as the one shown in FIG. 2. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Internal combustion engines are equipped with various exhaust-gas aftertreatment systems in order to reduce pollutant emissions. For the oxidation of unburned hydrocarbons and of carbon monoxide, an oxidation catalytic converter may be provided in the exhaust system. In applied-ignition engines, use is made of catalytic reactors, in particular three-way catalytic converters, with which nitrogen oxides are reduced by means of the non-oxidized exhaust-gas components, specifically the carbon monoxides and the unburned hydrocarbons, wherein the exhaust-gas components are simultaneously oxidized. In internal combustion engines which are operated with an excess of air, that is to say for example applied-ignition engines which operate in the lean-burn mode, but in particular direct-injection diesel engines or else direct-injection applied-ignition engines, the nitrogen oxides contained in the exhaust gas cannot be reduced out of principle, owing to the lack of reducing agent. To reduce the nitrogen oxides, use is made of SCR catalytic converters, in which a reducing agent is purposely introduced into the exhaust gas in order to selectively reduce the nitrogen oxides. It is also possible to reduce the nitrogen oxide emissions by means of so-called nitrogen oxide storage catalytic converters, also referred to as LNT. Here, the nitrogen oxides are initially absorbed, during a lean-burn mode of the internal combustion engine, that is to say collected and stored, in the catalytic converter before being reduced during a regeneration phase for example by means of substoichiometric operation ($\lambda<1$) of the internal combustion engine with a lack of oxygen. To minimize the emissions of soot particles, use is made of so-called regenerative particle filters which filter out and store the soot particles from the exhaust gas. The particles are intermittently burned off during the course of the regeneration of the filter.

In the internal combustion engine according to the disclosure, embodiments are advantageous in which at least one exhaust-gas aftertreatment system is provided in the exhaust-gas discharge system.

Different possibilities for exhaust-gas aftertreatment arise corresponding to the different embodiments of the exhaust manifold and/or of the exhaust-gas discharge system.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 111 may include one or more intake valves and one or more exhaust valves. For example, cylinder 141 is shown including at least one intake poppet valve 150 and at least one exhaust poppet valve 156 located at an upper region of cylinder 141. In some embodiments, each cylinder of engine 111, including cylinder 141, may include at least two intake poppet valves and at least two exhaust poppet valves located at an upper region of the cylinder.

Intake valve 150 may be controlled by controller 121 by cam actuation via cam actuation system 151. Similarly, exhaust valve 156 may be controlled by controller 121 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 121 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 141 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 141 can have a compression ratio, which is the ratio of volumes when piston 138 is at bottom dead center to top dead center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 111 may include a spark plug 192 for initiating combustion. Ignition system 190 can provide an ignition spark to combustion chamber 141 via spark plug 192 in response to spark advance signal SA from controller 121, under select operating modes. However, in some embodiments, spark plug 192 may be omitted, such as where engine 111 may initiate combustion by auto-ignition or by injection of fuel as may be the case with some diesel engines.

As a non-limiting example, cylinder 141 is shown including one fuel injector 166. Fuel injector 166 is shown coupled directly to cylinder 141 for injecting fuel directly therein in proportion to a pulse width of signal FPW received from controller 121 via electronic driver 168. In this manner, fuel injector 166 provides what is known as direct injection (hereafter also referred to as "DI") of fuel into combustion cylinder 141. While FIG. 1 shows injector 166 as a side injector, it may also be located overhead of the piston, such as near the position of spark plug 192. Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 121. It will be appreciated that, in an alternate embodiment, injector 166 may be a port injector providing fuel into the intake port upstream of cylinder 141. Though FIG. 1 shows a spark ignition engine the present disclosure is also compatible with a compression ignition engine.

As described above, FIG. 1 shows only one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 121 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 121 may receive various signals from sensors coupled to engine 111, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 121 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

FIG. 1 refers to an internal combustion engine including a plurality of cylinders, sensors, and pathways. The focus of this disclosure will now turn to FIG. 2, regarding an internal combustion engine with a plurality of cylinders, each cylinder being coupled to an exhaust runner including a gas particulate filter (GPF).

FIG. 2 illustrates a schematic of an example of an internal combustion engine 200 with individual particulate filters 264A-D in exhaust runners 262A-D of cylinders 248A-D of the engine 200. The present configuration of the engine 200 is shown with four cylinders. However, an engine with a different configuration with more or fewer cylinders may be used. Furthermore, engine 200 may be an example of engine 111 of FIG. 1 in some embodiments.

As shown in FIG. 2, the engine 200 includes an engine intake manifold 220 with an air intake passageway 222 leading to an air filter 224. A gas flow control device (e.g., an intake throttle 226) may be placed downstream of the air filter 224 to regulate the flow rate of air to an engine block 240. As an example, the intake throttle 226 may be an open throttle during a tip-in and may be a closed throttle during a tip-out. Intake air may flow past throttle 226 and into a compressor 227 of a turbocharger. Compressed intake air may flow through an engine intake pathway 230 to engine cylinder air intake valves 242A-D. As an example, the engine cylinder air intake valves 242A-D may adjust gas flow to engine cylinders 248A-D based on an engine speed, engine load, and/or AFR.

Exhaust gas recirculation (EGR) may flow from an EGR conduit 270, through an EGR intake control valve 280, into an engine EGR intake pathway 232, and to engine cylinder EGR intake valves 244A-D. As seen in the current embodiment, the engine air intake pathway 230 is separate from the engine EGR intake pathway 232 and the two gases are not permitted to mix prior to reaching their respective engine cylinder valves. However, in other embodiments, the two gases may mix and flow into a single pathway leading to one control valve regulating an amount of gas intake into an engine cylinder. Although a high pressure (HP) EGR system is shown (e.g., where exhaust gas flows from upstream of turbine 229 of the turbocharger to an intake pathway downstream of compressor 227 via EGR conduit 270), it is to be understood that additional or alternative EGR configurations may be included in engine 200. For example, an LP EGR system (e.g., where exhaust flows from downstream turbine 229 to an intake pathway upstream of compressor 227) may be included in engine 200 in some examples.

The engine cylinders 248A-D, located in an engine block 240, receive fuel from fuel injectors 246A-D, respectively. Exhaust runners 262A-D are coupled to engine cylinders 248A-D, respectively, at a first end and combine to form an exhaust manifold pathway 266 as part of the exhaust manifold 260 at a second end. Exhaust from the exhaust manifold 260 selectively flows through EGR conduit 270 and/or turbine 229. Exhaust that flows through turbine 229 is then provided to one or more exhaust aftertreatment devices, such as three way catalyst (TWC) 272. In typical exhaust systems, a single, large particulate filter may be placed downstream of a TWC. As shown in FIG. 2, each of the individual particulate filters 264A-D may be placed in a different one of the exhaust runners 262A-D of the engine cylinders 248A-D. Therefore, exhaust flowing from a first cylinder only flows through a first particulate filter (e.g., exhaust from cylinder 248A only flows through particulate filter 264A). In other words, a particulate filter only receives exhaust from an individual cylinder (e.g., particulate filter 264A receives exhaust from only cylinder 248A). In this way, the plurality of individual particulate filters, which may be smaller than particulate filters included in typical exhaust systems, may be included in the engine 200 instead of the single, large particulate filter that is typically present downstream of the TWC in other vehicles. It is to be understood that the individual particulate filters may be included in engine 200 in addition to a single, large particulate filter downstream of the TWC in other examples. The particulate filters 264A-D may comprise suitable material for trapping and/or removing particulates from exhaust gas passing through the filters.

As illustrated, an exhaust pressure sensor 268 is positioned upstream of the TWC 272 and the turbine 229 and within the exhaust manifold 260, downstream of the last particulate filter (e.g., particulate filter 264D). However, it is to be understood that other arrangements of aftertreatment devices, turbines, and exhaust pressure sensors may be included in other examples of engine 200. For example, the exhaust pressure sensor 268 may be positioned downstream of the turbine 229. The exhaust from the exhaust runners of the cylinders, merges in the exhaust manifold 260. The exhaust gas from each exhaust runner flows past the exhaust pressure sensor 268 and may flow to either the EGR conduit 270 or to the TWC 272. EGR conduit 270 flows exhaust gas towards the EGR intake control valve 280. The TWC 272 transforms harmful exhaust compounds into safer compounds before the exhaust is released to the atmosphere.

The pressure sensor 268 measures a pressure of exhaust gas in the exhaust manifold 260. The pressure sensor 268 may determine the pressure of exhaust gas originating from an individual engine cylinder (e.g., exhaust gas flowing from the cylinder through the associated exhaust runner to the exhaust manifold) based on a firing time. The firing time may be correlated to an individual cylinder ignition event in order to associate pressure measurements to the individual cylinder ignition event. The frequency at which the pressure sensor signal is sampled may be a selected frequency, and may be timed to correspond to individual cylinder ignition events. In one example, the pressure sensor signal may be sampled every time the controller receives a profile ignition pickup (PIP) signal. The PIP signal may be sent from a crankshaft sensor, such as Hall effect sensor 120 of FIG. 1, each time a tooth (or missing tooth) of a wheel coupled to the crankshaft passes by the Hall effect sensor. As crankshaft position is correlated with each individual cylinder ignition event, the position may be utilized to determine which individual cylinder ignition event corresponds to the pressure sensor signal measurement in the sample acquired at that crankshaft position.

The individual cylinder exhaust gas pressure measurement provides information to diagnose high particulate matter load in the particulate filters 264A-D. As one example, if the pressure sensor 268 measures the exhaust gas pressure amplitude for an individual cylinder as being below an expected exhaust pressure amplitude and/or an average exhaust pressure amplitude, then the particulate matter load of the individual particulate filter for that cylinder may be determined to be higher than an expected and/or acceptable particulate matter load. Thus, based on the measurement from the pressure sensor 268, a controller may command regeneration of the individual particulate filter responsive to diagnosing high particulate load on that particulate filter. In the above-described example, the expected exhaust pressure amplitude may be a predetermined value based on one or more parameters, such as a function of an airmass, and the average exhaust pressure amplitude may be an average measurement of exhaust pressure amplitudes associated with each cylinder over a period of time (e.g., a selected number of engine cycles). A measurement of exhaust gas pressure amplitude for a cylinder that is below a threshold may indicate that a fuel injector associated with the cylinder (e.g., the fuel injector that injects fuel into that cylinder) is degraded. In response to such a determination of a degraded fuel injector, an engine adjustment may be commanded in order to address the effects of the degraded fuel injector (e.g., the increased particulate load on the particulate filter resulting from increased particulate matter output from the degraded fuel injector). In some embodiments, the engine adjustment may include retarding the spark timing to increase the cylinder temperature to regenerate the particulate filter and/or clean the fuel injector of fouling. This example will be discussed in further detail below with respect to FIGS. 3, 4A, and 4B.

As another example, the particulate filter associated with a cylinder may be diagnosed as degraded responsive to determining that the exhaust gas pressure amplitude associated with that cylinder is greater than the expected exhaust pressure amplitude for that cylinder and/or the average exhaust pressure amplitude. A degraded particulate filter may include a damaged particulate filter (e.g., a leaking filter that does not trap an expected amount of particulate matter or otherwise allows additional particulate matter to pass through) and/or a particulate filter that is absent from the exhaust runner for that cylinder. In response to such an event, a controller of the engine may command an engine adjustment, including but not limited to setting a diagnostic trouble code for a missing particulate filter, displaying an indication of a missing particulate filter, shutting off the engine cylinder, etc. This example will be discussed in further detail below with respect to FIGS. 3, 4A, and 4B.

FIG. 3 is a high-level flow chart illustrating an example method 300 for determining high particulate matter load in a particulate filter in an exhaust runner of an engine cylinder based on a comparison of the measured exhaust pressure amplitude against a threshold. The threshold may be based on an expected exhaust pressure (e.g., based on a function of an airmass) and/or an average exhaust pressure calculated for all the engine cylinders over a period of time and a guard band.

Method 300 may begin by determining current engine operating parameters at 302. At 304, the method 300 includes determining if vehicle operation is steady. As one example, a vehicle operation may be steady if engine load, speed, rpm, spark, and/or other parameter(s) is constant for a threshold period of time (e.g., two seconds). If vehicle operation is not steady (e.g., "NO" at 304), the method returns to 302 and repeats the process until the vehicle operation is steady for the threshold period of time. If vehicle operation is steady (e.g., "YES" at 304), then the method 300 proceeds to 306 to measure an actual exhaust pressure amplitude (e.g., with exhaust pressure sensor 268 of FIG. 2). Measuring the exhaust pressure amplitude may include taking a sample of an exhaust pressure measurement that is timed for each cylinder exhaust stroke, each sample including one or more pressure pulses associated with exhaust output from a cylinder, as indicated at 308. It is to be understood exhaust pressure measurements may be continuously acquired (e.g., such that an uninterrupted signal is output from the exhaust pressure sensor during operation, the sample being a selected portion of the signal output from the sensor) or may only be acquired during the sampling time. As indicated at 310, amplitudes of pressure pulses in an exhaust pressure amplitude measurement sample may be associated to an individual cylinder based on comparing the sample time and/or the time at which the pressure pulses occurred to a firing time for each cylinder. As exhaust pressure amplitude pulses (e.g., peaks in an exhaust pressure sensor signal) may occur as a result of exhaust entering the exhaust manifold from an individual cylinder during that cylinder's exhaust stroke, an exhaust pressure amplitude measurement taken at a selected time may be associated with the individual cylinder that caused the exhaust pressure pulse at that time.

At 312, the method 300 includes comparing the measured actual exhaust pressure amplitude to a threshold. As indicated at 314, the threshold may be based on an expected exhaust pressure amplitude and a guard band (e.g., a range of exhaust pressure values, the highest exhaust pressure value being the uppermost edge of the guard band, and the lowest exhaust pressure value being the lowermost edge of the guard band). For example, the actual exhaust pressure amplitude may be analyzed to determine whether the actual exhaust pressure amplitude is greater than the sum of the expected exhaust pressure amplitude and the uppermost edge of the guard band or less than the sum of the expected exhaust pressure amplitude and the lowermost edge of the guard band. Additionally or alternatively, the threshold may be based on an average exhaust pressure amplitude and a guard band, as indicated at 316. For example, the actual exhaust pressure amplitude may be analyzed to determine whether the actual exhaust pressure amplitude is greater than the sum of the average exhaust pressure amplitude (e.g., an average of exhaust pressure amplitudes measured for all cylinders and/or over a period of time) and the uppermost edge of the guard band or less than the sum of the average exhaust pressure amplitude and the lowermost edge of the guard band.

At 318, the method 300 includes determining a particulate filter load and/or status for an associated individual cylinder based on the comparison at 312. For example, an actual exhaust pressure amplitude measurement that is less than an expected and/or average exhaust pressure amplitude plus the lowermost edge of a guard band may indicate that the particulate filter associated with the cylinder associated with that measurement is overloaded with particulate matter. An overloaded particulate filter may impede the flow of exhaust, thereby resulting in the lower than expected/average exhaust pressure measurement downstream of the filter. Conversely, an actual exhaust pressure amplitude measurement that is greater than an expected and/or average exhaust pressure amplitude plus the uppermost edge of a guard band may indicate that the particulate filter associated with the cylinder associated with that measurement is missing or leaking/degraded. A missing or leaking particulate filter may not impede exhaust flow as much as a normally operating/present particulate filter that is not leaking or otherwise degraded, thereby resulting in the higher than expected/average exhaust pressure measurement downstream of the filter. An actual exhaust pressure amplitude measurement that is within a guard band of an expected and/or average exhaust pressure amplitude (e.g., between the expected and/or average exhaust pressure amplitude plus the lowermost edge of the guard band and the expected and/or average exhaust pressure amplitude plus the uppermost edge of the guard band) may indicate that the particulate filter associated with the cylinder associated with that measurement is operating normally (e.g., present, not leaking or degraded, and not overloaded). As indicated at 320, the method 300 includes selectively performing an engine adjustment targeting the associated individual cylinder based on the particulate filter load/status for that individual cylinder. Example engine adjustments are described below with respect to FIG. 4B. It is to be understood that one or more steps of method 300 may be performed for each cylinder in order to diagnose particulate filters associated with each cylinder. For example, steps 306-320 may be performed for each exhaust stroke before returning to 302 or 304 in some embodiments. In additional or alternative embodiments, steps 306-320 may be performed to determine a status of a particulate filter associated with one of the cylinders of the engine, and the method may return to 302 (e.g., after selectively performing an engine adjustment) before performing steps 306-320 for another cylinder or another exhaust pressure amplitude measurement.

Figure 4A:
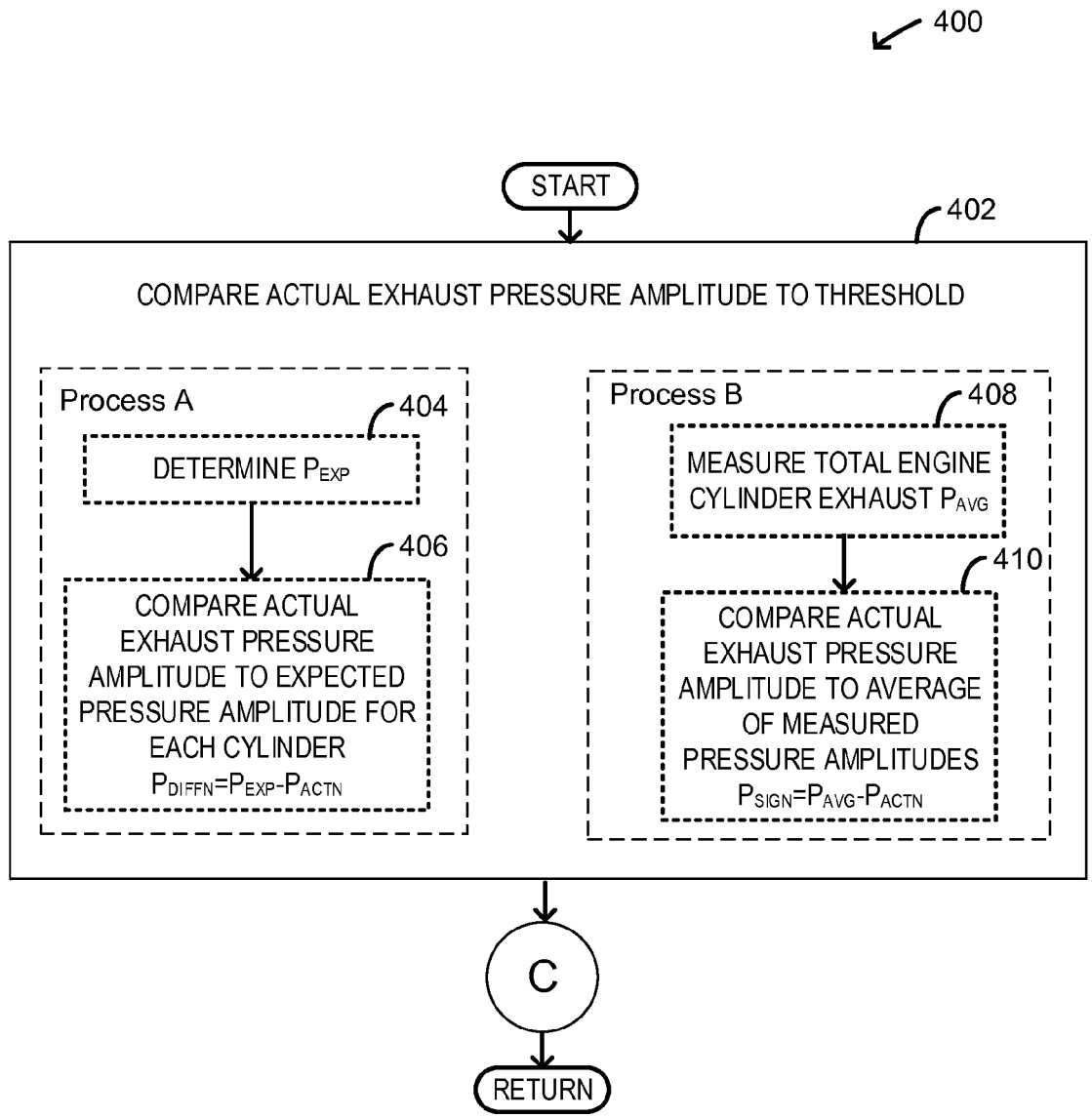
FIGS. 4A and 4B show flow charts illustrating a method to calculate pressure thresholds and compare a measured pressure against a pressure threshold to diagnose a degraded particulate filter.
Figure 4B:
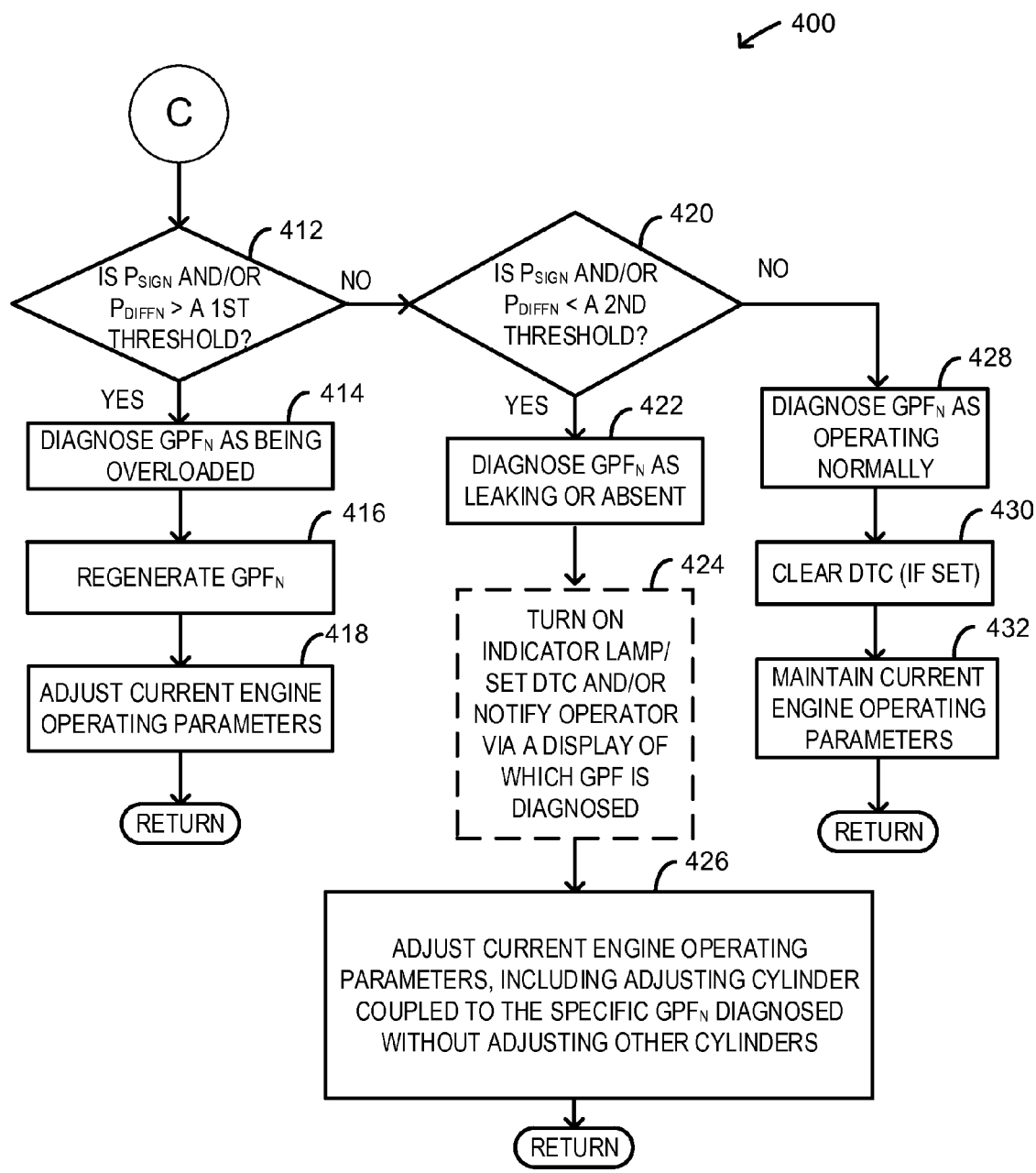

FIGS. 4A-4B show an example method 400 for diagnosing particulate filters and selectively performing engine adjustments responsive thereto. For example, the steps of method 400 may be performed during and/or as a part of one or more steps of method 300 of FIG. 3. At 402, the method 400 includes comparing an actual exhaust pressure amplitude to a threshold. For example, the actual exhaust pressure amplitude may be measured as described above with respect to step 306 of FIG. 3. In order to compare the actual exhaust pressure amplitude to a threshold, one or more of processes A and B may be performed. As shown below, processes A and B may be conducted substantially simultaneously and/or responsive to the same determination of steady vehicle operation (e.g., as determined at 304 of FIG. 3) in some examples. However, in other embodiments of the current system, processes A and B may be performed as alternatives to one another (e.g., only process A or only process B may be performed responsive to determining steady vehicle operation at 304 of FIG. 3).

Turning first to process A, at 404, the process may include calculating an expected pressure amplitude for an individual engine cylinder ($P_{EXP}$) (e.g., based on a function of an airmass—whereby the airmass may be affected by an engine speed, engine load, and/or AFR). It is to be understood that in some examples, the expected pressure amplitude may be predefined and/or determined prior to entering process A. In some embodiments, $P_{EXP}$ may be the same for each cylinder (e.g., resulting in only one $P_{EXP}$ value). For example, $P_{EXP}$ may be selected from a range of 7.5 in. Hg to 13 in. Hg based on engine configuration and/or engine operating parameters in some examples. In other embodiments, $P_{EXP}$ may be different for each cylinder (e.g., resulting in a $P_{EXPN}$ value calculation for each cylinder N). Upon calculating the expected exhaust pressure for the engine cylinders, the method 400 may proceed to 406. At 406, the method 400 may compare the $P_{ACTN}$ to the $P_{EXP}$ for an individual cylinder (or $P_{EXPN}$ if an expected pressure amplitude is calculated for each cylinder) to calculate a pressure difference ($P_{DIFFN}$) between the two values. $P_{DIFFN}$ is equal to the difference between $P_{EXP}$ and $P_{ACTN}$.

As described above, the method 400 may additionally or alternatively include process B. At 408, the process B may include measuring a total engine cylinder exhaust pressure amplitude average ($P_{AVG}$). $P_{AVG}$ may be a statistical average, calculated by measuring the exhaust pressure amplitudes for all the engine cylinders over a given duration of time (e.g., 5 seconds). In other embodiments, $P_{AVG}$ may be a weighted average, an average measurement of exhaust pressure amplitudes for an individual cylinder, or another average altogether. At 410, the method 400 may include calculating $P_{SIGN}$ for an individual cylinder N associated with the actual exhaust pressure amplitude measurement $P_{ACTN}$. $P_{SIGN}$ is equal to the difference between $P_{ACTN}$ and $P_{AVG}$. Responsive to performing process A and/or process B, the method 400 proceeds to 412, illustrated in FIG. 4B.

At 412, the method 400 includes comparing $P_{DIFFN}$ and/or $P_{SIGN}$ for an individual cylinder N to a first threshold. As one example, for process A (e.g., for comparison to $P_{DIFFN}$), the first threshold (e.g., 2 in. Hg) may be based on a guard band. If $P_{DIFFN}$ is greater than the first threshold, then the cylinder N may be causing a large pressure drop due to particulate matter load in the filter inhibiting the flow of the exhaust gas. For example, the particulate filter may be fouled due to a degraded fuel injector spray with a high particulate matter output (e.g., a fuel injector may be slightly clogged, deviating its spray pattern and causing it to release large fuel droplets that do not fully combust). In such an example of $P_{ACTN}$ being greater than the first threshold, the value of $P_{ACTN}$ of the engine cylinder N may be far enough below the value of $P_{EXP}$ to indicate that the particulate filter associated with cylinder N ($GPF_N$) is overloaded. Accordingly, responsive to determining that $P_{DIFFN}$ is greater than the first threshold (e.g., "YES" at 412), the method proceeds to 414 to diagnose the particulate filter associated with cylinder N as being overloaded.

As an additional or alternative example, for process B (e.g., for comparison to $P_{SIGN}$), the first threshold (e.g., 2 in. Hg) may be based on a guard band. In some embodiments, the guard band and/or the threshold for process B may be equal to the guard band and/or threshold for process A. However, the guard band and/or threshold for process B may be different than the guard band and/or threshold for process A in other embodiments. If $P_{SIGN}$ for cylinder N is greater than the first threshold, then the value of $P_{ACTN}$ may be determined to be far enough below the value of $P_{AVG}$ to indicate an overloaded particulate filter associated with cylinder N and the method may proceed to 414 as described above. It is to be understood that the method 400 may proceed to 414 if either $P_{SIGN}$ or $P_{DIFFN}$ is greater than the first threshold in some examples. In other examples, the method 400 may proceed to 414 only if both $P_{SIGN}$ and $P_{DIFFN}$ are greater than the first threshold. In still other examples in which only one of process A or process B is performed to compare an actual exhaust pressure amplitude to a threshold, the method 400 may proceed to 414 only if the calculated value for the performed process (e.g., $P_{DIFFN}$ for process A or $P_{SIGN}$ for process B) is greater than the first threshold.

At 416, the method may include regenerating the gas particulate filter associated with the cylinder N. In order to regenerate the particulate filter and/or otherwise compensate for the cause/effects of the overloaded particulate filter, the method may proceed to 418 to adjust current engine operating parameters. The engine adjustment at 418 may be targeted to only the engine cylinders with a degraded particulate filter and not to the cylinders without a degraded particulate filter. For example, the engine adjustment may include increasing the engine cylinder temperature for cylinder N by retarding the spark timing and increasing air flow to cylinder N. In this way, the temperature at the particulate filter may be increased to clean the particulate filter of excess particulates and/or a degraded fuel injector causing the overloaded particulate filter may be cleaned to prevent further fouling of that particulate filter. The engine operating parameter adjustments may apply to the individual engine cylinder(s) with a particulate filter with a high matter load, while the remaining engine cylinders may continue under current engine operating parameters. Upon performing any engine adjustments, the method may return to compare another exhaust pressure amplitude (e.g., for another cylinder) to a threshold. In some embodiments, the method may include determining if the particulate filter associated with cylinder N was also diagnosed as being overloaded in a previous iteration of method 400 (e.g., an immediately prior iteration and/or a last iteration of the method corresponding to that cylinder). In response to determining that the $GPF_N$ is still overloaded even after performing regeneration in a previous iteration of method 400, a diagnostic trouble code and/or other indicator may be set to indicate a faulty particulate filter. It is to be understood that a diagnosis of an overloaded particulate filter may additionally or alternatively result in a diagnosis of a faulty fuel injector for the cylinder (e.g., a fuel injector with a buildup of particulate matter causing a deviating spray pattern). Accordingly, a diagnostic trouble code may additional or alternatively be set indicating a faulty fuel injector responsive to $P_{SIGN}$ and/or $P_{DIFFN}$ being greater than the first threshold at 412 in some embodiments.

If $P_{SIGN}$ and/or $P_{DIFFN}$ is not greater than the first threshold (e.g., "NO" at 412), the method proceeds to 420. At 420, the method 400 includes comparing $P_{DIFFN}$ and/or $P_{SIGN}$ to a second threshold. As an example, for process A, the second threshold (e.g., 0.1 in. Hg) may be different than the first threshold. In some examples, the guard band may be associated with both the first and the second thresholds. For example, where the first threshold is 2 in. Hg and the second threshold is 0.1 in. Hg, the guard band may be a range from 0.1 in. Hg to 2 in. Hg (e.g., a range that is 1.9 in. Hg wide) such that the target value of $P_{ACTN}$ is between ($P_{EXP}$)+0.1) and ($P_{EXP}$+2) (for process A). If $P_{DIFFN}$ is less than the second threshold, then the $P_{ACTN}$ may be greater than the $P_{EXP}$ by an amount that is large enough to indicate that the particulate filter may have a leak or be absent. Accordingly, the method may proceed to 422 to diagnose the particulate filter associated with cylinder N (e.g., $GPF_N$) as being leaking, absent, or otherwise degraded if $P_{DIFFN}$ is less than the second threshold (e.g., "YES" at 420).

As an additional or alternative example, for process B, the second threshold (e.g., −1 in. Hg) may be different from the first threshold and/or different from the second threshold for process A. For example, where the first threshold is 2 in. Hg and the second threshold is −1 in. Hg, the guard band may be a range from −1 in. Hg to 2 in. Hg (e.g., a range that is 3 in. Hg wide) such that the target value of $P_{ACTN}$ is between ($P_{AVG}$−1) and ($P_{AVG}$+2) (for process B). If $P_{SIGN}$ is less than the second threshold, then the $P_{ACTN}$ may be greater than the $P_{AVG}$ by an amount large enough to indicate that the particulate filter may have a leak or be absent. Accordingly, the method may proceed to 422 to diagnose the particulate filter associated with cylinder N as being leaking, absent, or otherwise degraded if $P_{SIGN}$ is less than the second threshold (e.g. "YES" at 420).

It is to be understood that the method 400 may proceed to 422 if either $P_{SIGN}$ or $P_{DIFFN}$ is less than the second threshold in some examples. In other examples, the method 400 may proceed to 422 only if both $P_{SIGN}$ and $P_{DIFFN}$ are less than the second threshold. In still other examples in which only one of process A or process B is performed to compare an actual exhaust pressure amplitude to a threshold, the method 400 may proceed to 422 only if the calculated value for the performed process (e.g., $P_{DIFFN}$ for process A or $P_{SIGN}$ for process B) is less than the second threshold. It is to be understood that the determination at 412 and the determination at 420 may rely on the comparison of different values to the respective threshold. For example, the determination at 412 may rely only on a comparison of $P_{SIGN}$ to the first threshold, while the determination at 420 may rely only on a comparison of $P_{DIFFN}$ to the second threshold. In other examples, the determination at 412 may rely on a comparison of both $P_{SIGN}$ and $P_{DIFFN}$ to the first threshold, while the determination at 420 may rely only on a comparison of $P_{SIGN}$ to the second threshold. Any suitable combinations of comparisons may be performed during a given iteration of method 400.

At 424, the method 400 may include turning on an indicator lamp (e.g., provided in an instrument panel of a vehicle), setting a diagnostic trouble code (DTC), and/or otherwise providing an indication to an occupant of the vehicle or a system of the vehicle that the particulate filter for cylinder N is not operating normally (e.g., leaking, absent, etc.). At 426, the method 400 includes adjusting current engine operating parameters. For example, the adjustment at 426 may include performing a different engine adjustment than the adjustment performed at 418, such as shutting off the cylinder associated with the degraded particulate filter (e.g., disabling fuel injection to that cylinder, preventing intake air from flowing into that cylinder, etc.). Upon performing any engine adjustments, the method may return to compare another exhaust pressure amplitude (e.g., for another cylinder) to a threshold.

If $P_{SIGN}$ and/or $P_{DIFFN}$ are not less than the second threshold (e.g., "NO" at 420), the exhaust pressure amplitude measurement for that cylinder may be determined to be within the guard band (e.g., between the expected/average plus the lowermost edge of the guard band and the expected/ average plus the uppermost edge of the guard band). Accordingly, the method 400 may proceed to 428 to diagnose the gas particulate filter associated with the cylinder (e.g., $GPF_N$) as operating normally (e.g., not overloaded with particulate matter, not leaking, not missing, etc.). At 430, the method 400 includes clearing the DTC associated with that particulate filter/cylinder if it is set (e.g., from a previous iteration of method 400). At 432, the method 400 includes maintaining engine operating parameters. After clearing any DTCs for the particulate filter associated with that cylinder, the method may return to compare another exhaust pressure amplitude (e.g., for another cylinder) to a threshold. Attention will now be turned towards FIGS. 5A-C, which describe example pressure amplitude measurements for the particulate filters in the exhaust runners of the engine cylinders.

Now turning to FIG. 5A, a graph 500a for an exhaust pressure output signal 510 for an engine with a plurality of cylinders and individual particulate filters in exhaust runners thereof is shown. The x-axis represents crank angle and the y-axis represents pressure. A crank shaft rotates 180° CA from the completion of one exhaust event to another complete exhaust event (e.g., a crankshaft rotates 180° CA from 522A to 522C, with respect to FIG. 5a). As an example, the exhaust pressure output signal 510 may be a representative output for an engine 200 with cylinders 246A-D and individual particulate filters 264A-D placed in exhaust runners 262A-D (FIG. 2). The exhaust pressure output signal 510 includes exhaust pressure amplitudes at 522A-D corresponding to the exhaust outflow of the engine cylinders 246A-D based on a firing time. A pressure sensor measures exhaust pressures throughout the engine cycle based on a crankshaft angle (each sample exhaust pressure measurement represented by a dot on pressure output signal 510), which may then be correlated to an individual cylinder firing time. As an example, cylinders 246A-D are enumerated along the vertical axis proceeding from the first cylinder 246A in FIG. 2. In examples where the combustion order for the cylinders is 1-3-4-2, exhaust pressure amplitudes at 522A correspond with cylinder 246A, the exhaust pressure amplitude at 522C corresponds with cylinder 246C, the exhaust pressure amplitude 522D corresponds with cylinder 246D, and the exhaust pressure amplitude at 522B corresponds with cylinder 246B.

Signal 510 includes an expected/average exhaust pressure 514, an uppermost edge of a guard band 516, and a lowermost edge of the guard band 512. Pressure amplitudes at 522A-D are between the uppermost edge of the guard band 516 and the lowermost edge of the guard band 512 indicating no particulate filter is either fouled or leaking/missing.

The pressure sensor (e.g., pressure sensor 268 in FIG. 2) measures the exhaust pressure amplitudes at 522A-D based on a firing time, described above. However, a delay ΦA exists between a signal sent by the Hall Effect sensor measuring crankshaft position (e.g., indicating the end of the combustion event) and the engine cylinder exhaust exiting. As a result, 518A represents the end of the combustion event/the beginning of the exhaust event for cylinder 264A. As an example, a signal is sent to controller 121 as cylinder 246A combusts and as the piston reaches the bottom of its stroke, at the time indicated by 518A. Exhaust outflow occurs at the time indicated by 520A, after a predetermined amount of time ΦA1 passes from the combustion event. ΦA1 is represented by the distance between 518A and 520A on exhaust pressure output graph 500a. ΦA1 may be affected by engine load, speed, temperature, and/or air/fuel ratio. ΦA is equal for all engine cylinders. For illustrative purposes, only the first ΦA value is shown on the graph.

Further, a controller (e.g., controller 121 in FIG. 1) includes instructions for not only accounting for the delay described above (ΦA), but also accounting for a second delay ΦB. ΦB accounts for the time it takes the exhaust gas to flow from an engine cylinder to the exhaust pressure sensor. As a result, ΦB varies from cylinder to cylinder. ΦB may begin once a cylinder has ended its exhaust event (e.g., when the piston is at the top of the cylinder and exhaust gas has evacuated the cylinder, as shown by line 520A) and ends once the gas flows to (e.g., reaches) the pressure sensor, as shown by line 522A. The sample of exhaust pressure acquired by the pressure sensor is synchronous to a firing time, however the pressure sensor reading is offset by ΦBN, where N represents a cylinder number. As an example, ΦB1, which corresponds to cylinder 246A, is greater in value than ΦB2, which corresponds to cylinder 246C. This is due to the fact that the distance between cylinder 246A and the pressure sensor 268 is greater than the distance between cylinder 246C and the pressure sensor 268. As a result, ΦB1 is greater than ΦB2 to account for the greater distance the exhaust gas from cylinder 246A travels to reach pressure sensor 268. Further, ΦB may vary from one cylinder to another based on cylinder adjustment. Cylinder adjustments affecting ΦB may include, but are not limited to engine speed, engine load, and air/fuel ratio. As an example, any one of the three adjustments listed may affect exhaust gas flow speed, wherein the difference would proportionally affect ΦB. Both ΦA1 and ΦB1-5 enable the controller to compensate for delays in the system and to instruct the pressure sensor to precisely measure a pressure amplitude of an individual cylinder based on a firing time.

Now turning to FIG. 5B, a graph 500b for an exhaust pressure output signal 540 for an engine with a plurality of cylinders and individual particulate filters in exhaust runners thereof is presented. The x-axis represents crank angle and the y-axis represents pressure. A crank shaft rotates 180° CA from the completion of one exhaust event to another complete exhaust event (e.g., a crankshaft rotates 180° CA from 548A to 548C, with respect to FIG. 5B). As an example, the exhaust pressure output signal 540 may be a representative output for an engine 200 with cylinders 246A-D and individual particulate filters 264A-D placed in exhaust runners 262A-D (FIG. 2). The exhaust pressure output signal 540 includes exhaust pressure amplitudes at 548A-D corresponding to the exhaust outflow of the engine cylinders 246A-D based on a firing time. A pressure sensor may measure exhaust pressures throughout the engine cycle based on a crankshaft angle (represented by dots on pressure output signal 540), which may then be correlated to an individual cylinder firing time. As an example, cylinders 246A-D are enumerated along the vertical axis proceeding from the first cylinder 246A. In examples where the combustion order for the cylinders is 1-3-4-2, exhaust pressure amplitudes at 548A correspond with cylinder 246A, the exhaust pressure amplitude at 548C corresponds with cylinder 246C, the exhaust pressure amplitude at 548D corresponds with cylinder 246D, and the exhaust pressure amplitude at 548B corresponds with cylinder 246B.

Graph 500b shows an example of an engine cylinder with a fouled particulate filter. The pressure amplitude at 548C is below the lowermost edge of the guard band 512 for the expected or average pressure 514. In this way, the signal 540 illustrates a pressure drop in exhaust from cylinder 246C that is indicative of a deposit of particulate matter present on the associated particulate filter that is abundant enough to impede flow of exhaust from that cylinder from reaching the exhaust pressure sensor. Fouling of cylinder 246C may be caused by a degraded injector spray. The controller may adjust conditions to only cylinder 246C, while the remaining cylinders maintain their current operating parameters. Adjustments may include retarding spark timing and/or increasing air flow to the individual cylinder 246C.

Now turning to FIG. 5C, a graph 500c for an exhaust pressure output signal 570 for an engine with a plurality of cylinders and individual particulate filters in exhaust runners thereof is presented. The x-axis represents crank angle and the y-axis represents pressure. A crank shaft rotates 180° CA from the completion of one exhaust event to another complete exhaust event (e.g., a crankshaft rotates 180° CA from 578A to 578C, with respect to FIG. 5C). As an example, the exhaust pressure output signal 570 may be a representative output for an engine 200 with cylinders 246A-D and individual particulate filters 264A-D placed in exhaust runners 262A-D (FIG. 2). In such examples, the exhaust pressure output signal 570 displays exhaust pressure amplitudes at 578A-D corresponding to the exhaust outflow of the engine cylinders 246A-D based on a firing time. A pressure sensor measures exhaust pressures throughout the engine cycle based on a crankshaft angle (represented by dots on pressure output signal 570), which may then be correlated to an individual cylinder firing time. As an example, cylinders 246A-D are enumerated along the vertical axis proceeding from the first cylinder 246A. In examples where the combustion order for the cylinders is 1-3-4-2, exhaust pressure amplitudes at 578A correspond with cylinder 246A, the exhaust pressure amplitude at 578C corresponds with cylinder 246C, the exhaust pressure amplitude at 578D corresponds with cylinder 246D, and the exhaust pressure amplitude at 578B corresponds with cylinder 246B.

Graph 500c shows an example of an engine cylinder with a leaking/missing particulate filter. Exhaust outputs at 578A are both over the uppermost edge of the guard band 516, indicative of a missing/leaking particulate filter in the exhaust runner coupled to cylinder 246A. The missing/leaking particulate filter no longer impedes the flow of exhaust as a present/whole particulate filter, resulting in the pressure readings that exceed the uppermost edge of the guard band 516. The particulate filter may be missing or leaking due to a regeneration temperature exceeding a threshold regeneration temperature (e.g., 800° F.). The controller may make adjustments to only the individual cylinder 246A, while the remaining cylinders may maintain current engine operating parameters. The adjustments may include shutting off the cylinder 246A and turning on an indicator light.

By performing the above-described methods, the engine system according to this disclosure may activate particulate filter regeneration more easily than other engine systems due to the filter proximity to the cylinder, where temperatures are higher. Further, only a cylinder corresponding to the particulate filter with a high particulate matter load may retard spark timing, thereby improving fuel economy. The technical effect of placing a particulate filter in the exhaust runner of the engine cylinder and comparing measured exhaust pressure amplitudes to expected and/or average exhaust pressure amplitudes is to provide a less intrusive method for particulate filter regeneration along with diagnosing a degraded fuel injector and/or particulate filter. The particulate filters in the exhaust runners are smaller in size when compared to a typical particulate filter placed in the underbody canister of the exhaust system. In this way, the system described in this disclosure may reduce costs relative to systems in which the particulate filter is positioned in the underbody canister.

A method of a system may include flowing exhaust from a first cylinder through a first particulate filter in a first runner, flowing exhaust from a second cylinder through a second particulate filter in a second runner, and adjusting engine operation in response to particulate filter degradation, the particulate filter degradation distinguishing between degradation of the first and second particulate filters based on exhaust pressure pulsation timing relative to combustion events.

The method, additionally or alternatively, may include the first exhaust runner and the first particulate filter receiving exhaust only from the first cylinder. Further, the method may additionally or alternatively comprise merging the exhaust from the first and second runners in an exhaust manifold, and sensing the exhaust pressure of the merged exhaust. The adjusting, additionally or alternatively, may include adjusting engine operation in response to particulate filter degradation further comprises determining the particulate filter degradation based on a comparison of a measured exhaust pressure amplitude against a threshold, wherein the threshold is a first threshold. The method may additionally or alternatively further comprise performing a first engine adjustment responsive to the measured exhaust pressure amplitude being below the first threshold and performing a second engine adjustment responsive to the measured exhaust pressure amplitude being above a second threshold.

The method, additionally or alternatively, may further include the measured exhaust pressure amplitude being associated with the first cylinder based on exhaust pressure pulsation timing of the measured exhaust pressure amplitude relative to a combustion event of the first cylinder, and wherein the first engine adjustment includes increasing an engine cylinder temperature of the first cylinder. The engine cylinder temperature increase, additionally or alternatively, may include increasing the engine cylinder temperature via performing spark retard or air/fuel ratio adjustment to regenerate the first particulate filter. The method, additionally or alternatively, may include the exhaust pressure sensor measuring the engine cylinder exhaust pressure based on a firing time, the firing time being correlated to an individual cylinder ignition event.

Another method for an engine comprises flowing exhaust gas through individual exhaust runners from each of a plurality of cylinders, each runner having a particulate filter located therein, merging exhaust from each of the plurality of cylinders downstream of each of the particulate filters; sampling exhaust pressure of the merged exhaust gas synchronous with cylinder events, and distinguishing degradation among each of the particulate filters based on firing order and peak amplitude of the sampled exhaust pressure. The merging, additionally or alternatively, may include merging exhaust from each of the plurality of cylinders in an exhaust gas manifold.

The method, additionally or alternatively, may include sampling the exhaust pressure of the merged exhaust gas comprises sampling the exhaust pressure with an exhaust pressure sensor located downstream of the particulate filters. The exhaust pressure sensor may additionally or alternatively be located upstream of a catalytic converter. The method may additionally or alternatively include sampling the exhaust pressure, and may additionally or alternatively further comprise timing samples of exhaust pressure measurements to correspond to each cylinder exhaust stroke. The timing the samples of exhaust pressure measurements to correspond to each cylinder exhaust stroke may additionally or alternatively comprise delaying sample timing for each cylinder based on an indication of completion of an exhaust event for that cylinder and an exhaust gas flow rate.

The method, additionally or alternatively, may further include the distinguishing degradation based on the peak amplitude further comprising distinguishing a particulate filter as fouled responsive to the peak amplitude being less than a first threshold exhaust pressure, and distinguishing a particulate filter as missing or leaking responsive to the peak amplitude being greater than the threshold exhaust pressure. The threshold exhaust pressure may additionally or alternatively be based on an expected exhaust pressure amplitude and a guard band.

An embodiment of a system comprises a plurality of cylinders each coupled to an exhaust runner, an exhaust manifold coupled to each of the exhaust runners, a plurality of particulate filters, each particulate filter positioned in a different one of the exhaust runners, a pressure sensor, and a controller with computer-readable instructions for distinguishing degradation among each of the particulate filters based on an actual exhaust pressure amplitude measured by the pressure sensor relative to one or more of an expected exhaust pressure amplitude and an average exhaust pressure amplitude, the expected exhaust pressure being based on the function of an airmass.

The system, additionally or alternatively, may include the controller further comprising instructions for performing a first engine adjustment responsive to determining that the actual exhaust pressure amplitude associated with at least one cylinder of the plurality of cylinders is below a first threshold and performing a second engine adjustment responsive to the actual exhaust pressure amplitude of the at least one cylinder of the plurality of cylinders being above a second threshold. The first engine adjustment may additionally or alternatively include increasing an engine cylinder temperature of the at least one cylinder of the plurality of cylinders. The system, additionally or alternatively, may include the pressure sensor being located downstream of the plurality of particulate filters and upstream of a catalytic converter of the engine. The system may additionally or alternatively include each exhaust runner being coupled to and receiving exhaust from only one of the plurality of cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   flowing exhaust gas through individual exhaust runners from each of a plurality of cylinders, each runner having a particulate filter located therein;
   merging exhaust from each of the plurality of cylinders downstream of each of the particulate filters;
   sampling exhaust pressure of the merged exhaust gas synchronous with cylinder events;
   distinguishing degradation among each of the particulate filters based on firing order and peak amplitude of the sampled exhaust pressure; and
   adjusting engine operation in response to particulate filter degradation among one or more of the particulate filters.

2. The method of claim 1, wherein the merging comprises merging exhaust from each of the plurality of cylinders in an exhaust gas manifold.

3. The method of claim 1, wherein sampling the exhaust pressure of the merged exhaust gas comprises sampling the exhaust pressure with an exhaust pressure sensor located downstream of the particulate filters.

4. The method of claim 3, wherein the exhaust pressure sensor is located upstream of a catalytic converter, the method further comprising adjusting engine operation with a first adjustment based on degradation identified for only a first particulate filter among the plurality, and adjusting engine operation with a second, different, adjustment based on degradation identified for only a second particulate filter among the plurality.

5. The method of claim 4, wherein sampling the exhaust pressure comprises timing samples of exhaust pressure measurements to correspond to each cylinder exhaust stroke.

6. The method of claim 5, wherein timing the samples of exhaust pressure measurements to correspond to each cylinder exhaust stroke further comprises delaying sample timing for each cylinder based on an indication of completion of an exhaust event for that cylinder and an exhaust gas flow rate.

7. The method of claim 1, wherein distinguishing degradation based on the peak amplitude further comprises distinguishing a particulate filter as fouled responsive to the peak amplitude being less than a first threshold exhaust pressure, and distinguishing a particulate filter as missing or leaking responsive to the peak amplitude being greater than the first threshold exhaust pressure, the method further comprising generating different indications to an operator responsive to which of the degradations has been distinguished.

8. The method of claim 7, further comprising determining the first threshold exhaust pressure based on an expected exhaust pressure amplitude and a guard band.

9. An engine comprising:
   a plurality of cylinders each coupled to an exhaust runner;
   an exhaust manifold coupled to each of the exhaust runners;
   a plurality of particulate filters, each particulate filter positioned in a different one of the exhaust runners;
   a pressure sensor; and
   a controller with computer-readable instructions for:
      distinguishing degradation among each of the particulate filters based on an actual exhaust pressure amplitude measured by the pressure sensor relative to one or more of an expected exhaust pressure amplitude and an average exhaust pressure amplitude, the expected exhaust pressure amplitude being based on the function of an airmass; and
      adjusting engine operation in response to particulate filter degradation among one or more of the particulate filters.

10. The engine of claim 9, wherein the controller further comprises instructions for,
    performing a first engine adjustment responsive to determining that the actual exhaust pressure amplitude associated with at least one cylinder of the plurality of cylinders is below a first threshold and performing a second engine adjustment responsive to the actual exhaust pressure amplitude of the at least one cylinder of the plurality of cylinders being above a second threshold.

11. The engine of claim 10, wherein the first engine adjustment includes increasing an engine cylinder temperature of the at least one cylinder of the plurality of cylinders, wherein the engine further comprises a turbocharger including a turbine positioned downstream of the exhaust manifold, and wherein the pressure sensor is located downstream of the plurality of particulate filters and downstream of the turbine.

12. The engine of claim 9, wherein the pressure sensor is located downstream of the plurality of particulate filters and upstream of a catalytic converter of the engine and wherein each exhaust runner is coupled to and receives exhaust from only one of the plurality of cylinders.

* * * * *